(12) United States Patent
Shah et al.

(10) Patent No.: US 10,909,091 B1
(45) Date of Patent: Feb. 2, 2021

(54) ON-DEMAND DATA SCHEMA MODIFICATIONS

(71) Applicant: Amazon Technologies, Inc., Seattle, WA (US)

(72) Inventors: Aakash Shah, Santa Clara, CA (US); Kamal Kant Gupta, Snoqualmie, WA (US); Alexandre Olegovich Verbitski, Woodinville, WA (US); Sailesh Krishnamurthy, Palo ALto, CA (US); Hyungsoo Jung, Seattle, WA (US); Anurag Windlass Gupta, Atherton, CA (US); Zhaohui Zhang, Menlo Park, CA (US); Tengiz Kharatishvili, Sammamish, WA (US); Stefano Stefani, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 353 days.

(21) Appl. No.: 15/360,787

(22) Filed: Nov. 23, 2016

(51) Int. Cl.
G06F 16/21 (2019.01)
G06F 16/23 (2019.01)
G06F 16/22 (2019.01)

(52) U.S. Cl.
CPC ........ G06F 16/211 (2019.01); G06F 16/2282 (2019.01); G06F 16/2379 (2019.01)

(58) Field of Classification Search
CPC ......... G06F 17/30292; G06F 17/30339; G06F 17/30377; G06F 17/30297; G06F 16/211; G06F 16/2379; G06F 16/2282
See application file for complete search history.

(56) References Cited

U.S. PATENT DOCUMENTS

| | | | |
|---|---|---|---|
| 5,717,924 A | 2/1998 | Kawai | |
| 5,794,030 A | 8/1998 | Morsi et al. | |
| 6,356,913 B1 | 3/2002 | Chu et al. | |
| 7,287,034 B2 | 10/2007 | Wong et al. | |
| 2007/0294266 A1* | 12/2007 | Chowdhary | G06F 16/211 |
| 2008/0168109 A1* | 7/2008 | Gaurav | G06F 16/213 |
| 2009/0037769 A1* | 2/2009 | Babkin | G06F 17/30516 |
| | | | 714/15 |
| 2011/0173168 A1* | 7/2011 | Jones | G06F 16/88 |
| | | | 707/695 |
| 2014/0279920 A1* | 9/2014 | Madhavarapu | G06F 11/1458 |
| | | | 707/649 |
| 2015/0248403 A1* | 9/2015 | Pazdziora | G06F 17/303 |
| | | | 707/809 |
| 2015/0363434 A1* | 12/2015 | Cerasaro | G06F 17/30297 |
| | | | 707/616 |
| 2016/0140149 A1* | 5/2016 | Lin | G06F 17/30297 |
| | | | 707/803 |

* cited by examiner

*Primary Examiner* — Robert W Beausoliel, Jr.
*Assistant Examiner* — Mohammad Solaiman Bhuyan
(74) *Attorney, Agent, or Firm* — Robert C. Kowert; Kowert, Hood, Munyon, Rankin & Goetzel, P.C.

(57) ABSTRACT

A data store may implement on-demand data schema modifications. Request to change a schema for a data set in a data store may be received and a description of the change recorded as part of a schema history for the data set. The request to change the schema may then be acknowledged. When access requests directed to the data set are received at the data store, the schema history for the data set may be evaluated. If the schema history indicates that data that is to be accessed in order to service the data store needs to include one or more changes in the schema history, then a version of the schema that includes the one or more changes may be applied to the data.

20 Claims, 10 Drawing Sheets

ON-DEMAND DATA SCHEMA MODIFICATIONS

BACKGROUND

Data schemas optimize the ways in which stored data is managed or accessed in a data store. For example, a common data model, such as a relational data model, may allow for storage engines or other systems that access the data to utilize languages or commands based on first-order predicate logic to search for data that satisfies quantified variables. For example, Structured Query Language (SQL) allows for queries to be performed over data that satisfy various predicate conditions identified by a SQL statement. Changes can be performed with respect to data schemas in order to change the optimization of the data. If, for instance, additional information should be stored as part of individual items in a data set, then the data schema may be changed to account for or identify that the additional information is included in items. As changes to a data schema impact an entire set of data stored according to the data schema, implementing changes to the data schema may grow more costly as the amount of data increases. With the amount of data collected and managed growing ever larger, efficiently performing changes to data schemas con provide correspondingly greater cost savings.

Figure 1:
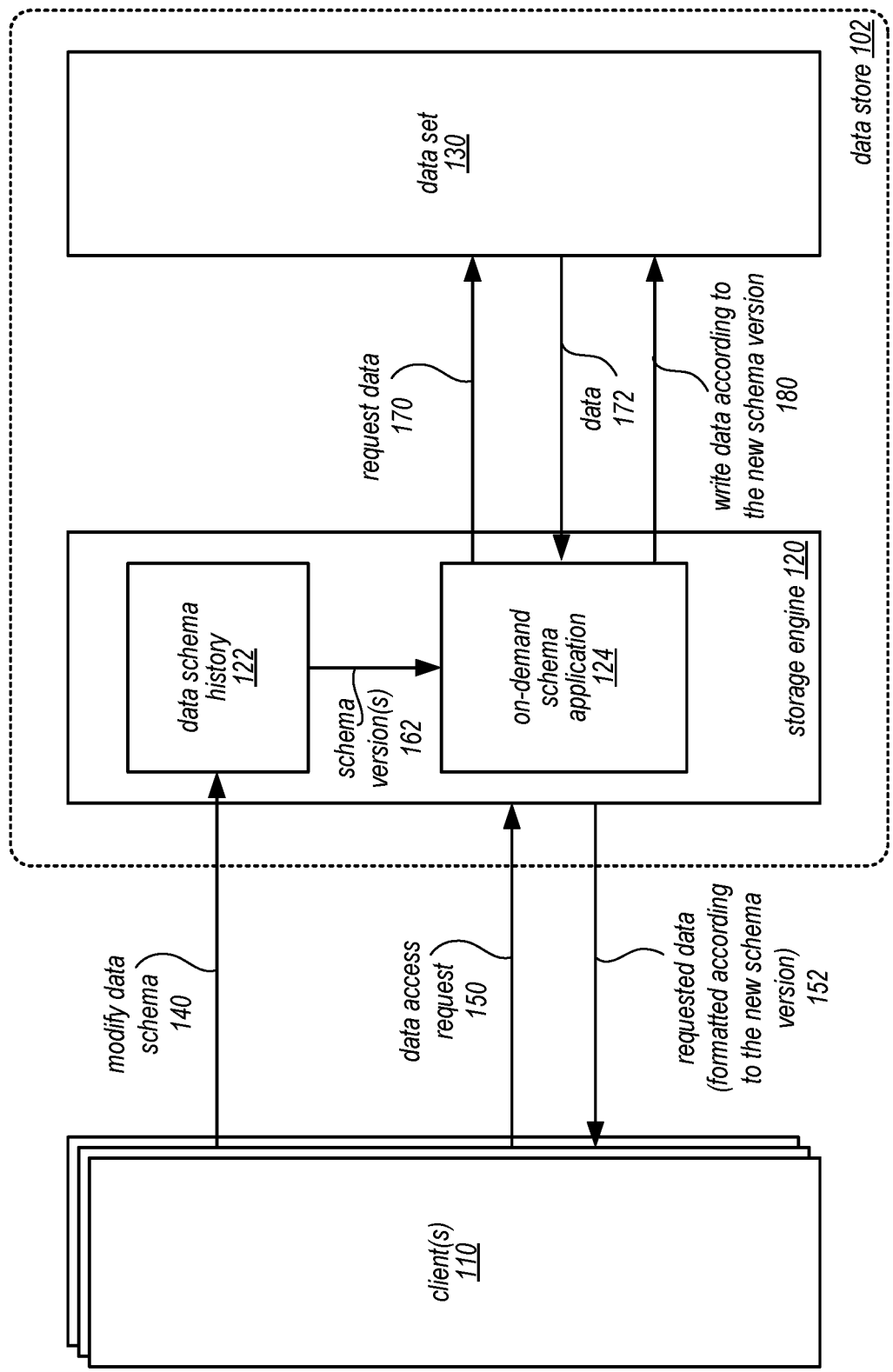
FIG. 1 is a logical diagram that illustrates on-demand data schema modifications, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of on-demand data schema modifications are described herein. Data schemas (e.g., data structures, formats, models, or other information describing how data in a data set should be stored) may be implemented for data sets stored in a data store. Access requests, such as searches or queries for particular data, as well as access requests to add, remove, change, modify, or otherwise update existing data may utilize the data schema in order to execute the access request. For example, a data set may be stored as a relational database table that includes various rows, items or entries including a number of data fields corresponding to different columns in the database table. The columns of the database table, including a data type for the data stored in a column, may be defined, identified, or otherwise described by the data schema for the database table. As the information that is needed to be maintained in a data set can change, corresponding changes in the data schema can be made to accommodate the changing information. For example, a column in a database table can be added or removed or the data type or expected/default value for a column can be changed in the data schema, so that the data set maintains the appropriate data in an expected format.

Changes to a data schema may be specified according to an interface for managing a data set. The interface may interpret data definition language (DDL) requests that can define or redefine a data schema for data. For example, data sets maintained in a relational database table, may be accessed or managed using Structured Query Language (SQL) interface. SQL includes statements, such as "CREATE TABLE," "ALTER TABLE," or "DROP TABLE," that can be submitted as requests to be performed in a data store that affect the data schema for tables stored in the data store (e.g., upon creation, alteration, or deletion of tables). Such changes to the data schema once submitted affect the entire set of data (e.g., the entire table) to which the data schema is applied. So if a data schema change is made to add an additional object to an item in a data set, for example, then the data schema change would direct that each item in the data set add an additional object corresponding to the change. Because data schema changes affect the entire data set, several different techniques for maintaining data consistently (with respect to attempts to access the data while data schema changes are performed) have been developed.

Typically, data schema changes have been performed while a data set is "offline" or unavailable for access. For example, a data schema change request to reorder columns in a table would require that the order in which the data is stored for a row in the table be changed in storage for each row in the table. To ensure that one row in the table is not accessed that stores data for columns according to the prior data schema, access to the table could be denied while the reordering of data is performed. Offline data schema changes protect consistency at the expensive of accessibility so that changes to large data sets could result in long down times each time a data schema change is needed. In order improve the accessibility of data sets undergoing data schema changes "online" data schema changes have been implemented so that access to the data set may still be allowed (at least for some types of data schema changes).

Online data schema changes typically utilize additional storage space to recreate a duplicate of the data set according to a submitted data schema change. While the duplicate data set is constructed, access to the original data set (formatted according to the data schema without the change) is allowed. Once the duplicate of the data set is completed, access requests may then be redirected to the duplicate data set stored according to the updated data schema. While such online techniques do allow for access to the data set to continue, the costs of building a duplicate data set may quickly become prohibitive. For instance, large data sets would require at least double the amount of storage to have sufficient space to create a duplicate data set. Additionally the processing and Input/Output (I/O) costs to read and re-write each portion of the data set could dramatically shift resources away from processing access requests directed to the data set. On-demand data schema modifications, however, could offer the accessibility of online data schema changes without burdensome costs of creating duplicate data sets. In this way, resources may be better devoted to handling requests to access a data set, even if that data set is undergoing a data schema change.

FIG. 1 is a logical diagram that illustrates on-demand data schema modifications, according to some embodiments. Storage engine 120 may be any type of access controller that processes requests from client(s) 110 of data store 102, such as a database engine that provides client access to a database. Storage engine 120 may process both requests to access data 150 in data set 130 and requests to modify a data schema 140 for data set 130 (e.g., DDL requests). Data set 130 may be any collection of data stored according to a data schema (e.g., a data structure, such as binary tree (b-tree), that maintains data blocks, pages, or other storage locations that include one or multiple items of data (e.g., rows in a table) in data store 102 on one or more storage devices (e.g., persistent, block-based storage devices such as hard disk drives (HDDs) or solid state drives (SSDs)). Storage engine 120 may be implemented as part of data store 102 and may be remote from data set 130 (e.g., via network connection from a computing device implementing storage engine 120 and a remote storage server implementing storage devices that maintain data set 130), or local to data set 130 (e.g., as part of the same computing device, where data set 130 is stored in persistent storage devices directly attached to the computing device).

Storage engine 120 may process requests to modify the data schema 140 for data set 130. For example, if storage engine 120 provides a SQL interface to client(s) 110, then an ALTER TABLE request may be submitted by a client(s) 110 to change a table. Storage engine 120 may store a description of the modification to the schema in data schema history 122. In some embodiments, data schema history 122 may be persistently stored along with other storage engine 120 metadata (e.g., as part of a data dictionary) in persistent storage devices that maintain data set 130. In some embodiments, as discussed below with regard to FIGS. 3, and 6-8, an in-memory cache (e.g., such as in system memory 1020 in FIG. 10) of data schema history 122 may be implemented so that descriptions received modifications 150 may be stored in the in-memory cache (in addition to persistent storage). Once the description of the modification is stored in data schema history 122, then the data schema modification may be considered applied to data set 130. A series of modifications may be stored so that different versions of the data schema at different points in time may be recreated from the descriptions of the changes in data schema history.

For example, client(s) 110 (which may or may not be the same client that submitted a data schema modification 140) may also submit data access requests 150 to storage engine. Data access requests may be specified according to a data modification language (DML). For example, consider the SQL interface noted above. In addition to DDL statements, SQL may also provide for DML statements, such as INSERT, UPDATE, or DELETE. Data access request 150 may also be a request to search, evaluate, or otherwise query data set 130 for particular data that satisfies different conditions. For example, the SQL interface provides a SELECT statement which includes one or multiple predicate conditions defined by WHERE statements within the SELECT statement that may be query to find data that satisfies the WHERE statements. In some embodiments, access requests 150 may be performed as part of a transaction directed to data set 130 which may have been initiated prior to the receipt of a request to modify data schema 140. Storage engine 120 may implement on-demand schema application 124 when processing data access requests 150 so that schema changes are applied to data as the data is accessed to service the access request.

Figure 7:
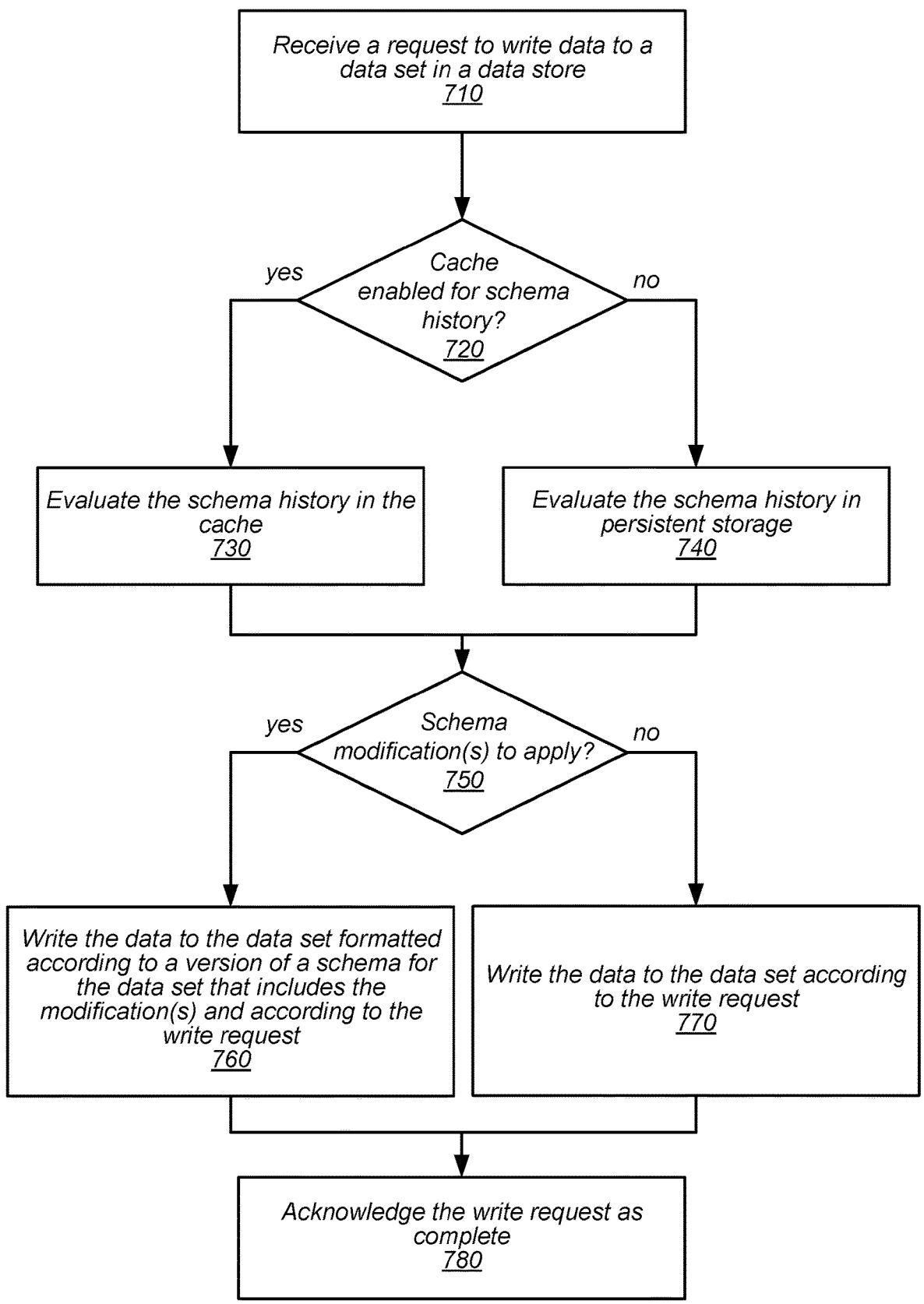
FIG. 7 is a high-level flowchart illustrating techniques to process a request to write data to a data set that implements on-demand data schema modifications, according to some embodiments.

An access request 150 that modifies data set 130, such as a write request (e.g., INSERT or UPDATE in SQL) discussed below with regard to FIG. 7, may be received and schema changes received prior to the write request but have not yet been applied to the data may then be applied to the data. For example, on-demand schema application 124 may evaluate the data and data schema history 122 to determine whether or not any changes made to the data schema have yet to be applied to the data. For example, data schema history 122 may be accessed and evaluated based on a version number, sequence number or other indication of which data schema the data is currently stored and whether any subsequent schema versions need to be applied to the data, as discussed below with regard to FIGS. 7-9. If a schema version is to be applied, then the schema version 162 may be obtained by reading the description of the changes included in the version from data schema history 122 and applied to the data for the access request.

Applying the version 162 of the data schema may be performed different for different access requests. If, for instance, the data access request is a read request, then storage engine 120 may request the data 170 from data set 130 and reformat data 172 that is received from data set 130 to apply the version 162 of the schema. For example, if the order of columns is to be changed according to schema version 162, then the order of columns in data 172 may be changed. This reformatted data may then be used to return request(s) 152. If the access request is a write request, then the data in data set 130 may be changed to match schema version 162. For instance, if writing new data, the new data may be written according to the new schema version 180. In this way, each time data is added or modified in data set 130 persistently, the changes to the data schema may be applied. As each portion of data is accessed for a write request, the data may be updated to a new version of the schema 162 so that eventually the entire data set 130 is reformatted according to a new schema version 162. In this way, data schema changes are applied as needed without utilizing any additional storage space, allowing for near instantaneous application of data schema changes. Moreover, as a larger data structure in which the data is stored need not be changed (e.g., a b-tree structure), data schema changes may be performed in way that is backward and forward compatible with storage engines or other applications that access the data based on an understanding of the larger data structure.

Please note, FIG. 1 is provided as a logical illustration of on-demand data schema modifications, and is not intended to be limiting as to the arrangement or configuration of a storage engine, data set, clients, or other components to implement on-demand schema application.

The specification first describes an example of a database service that may implement on-demand data schema modifications for data hosted by the database service, according to various embodiments. The example database service may host data for many different types of clients, in various embodiments. Included in the description of the example network-based database service are various aspects of the example network-based database service along with the various interactions between the database service and a separate storage service which may store the data on behalf of the database service. The specification then describes a flowchart of various embodiments of methods for on-demand data schema modifications. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit access requests and data schema modifications using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., request processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing request parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the storage layer may also assume the responsibility for the replication of data stored on behalf of clients (and/or metadata associated with that data, such as redo log records) across multiple storage nodes.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side to driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

Figure 2:
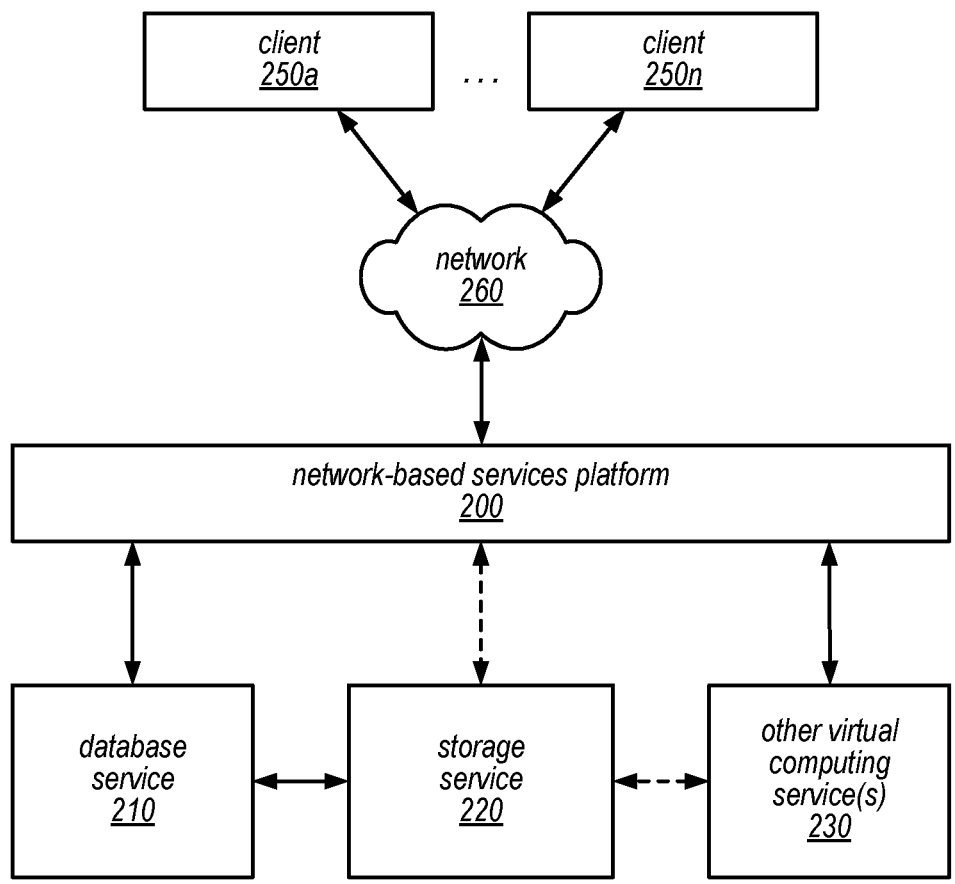
FIG. 2 is a block diagram illustrating a service system architecture that may be configured to implement a network-based database service and a network-based storage service that may provide access to data, according to some embodiments.

FIG. 2 is a block diagram illustrating a service system architecture that may be configured to implement a network-based database service and a network-based storage service that may provide access to data, according to some embodiments. In the illustrated embodiment, a number of clients (shown as clients 250a-250n) may be configured to interact with a network-based services platform 200 via a network 260. Network-based services platform 200 may be configured to interface with one or more instances of a database service 210, a storage service 220 and/or one or more other virtual computing services 230. Storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a request to modify a data schema of a database table stored in data storage service 220 or a request to query a database) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of storage service 220 in storing databases on behalf of clients 250 may be transparent to those clients. In other embodiments, storage service 220 may be exposed to clients 250 through network-based services platform 200 to provide storage of databases or other information for applications other than those that rely on database service 210 for database management. This is illustrated in FIG. 2 by the dashed line between network-based services platform 200 and storage service 220. In such embodiments, clients of the storage service 220 may access storage service 220 via network 260 (e.g., over the Internet). In some embodiments, a virtual computing service 230 may be configured to receive storage services from storage service 220 (e.g., through an API directly between the virtual computing service 230 and storage service 220) to store objects used in performing computing services 230 on behalf of a client 250. This is illustrated in FIG. 2 by the dashed line between virtual computing service 230 and storage service 220. In some cases, the accounting and/or credentialing services of platform 200 may be unnecessary for internal clients such as administrative clients or between service components within the same enterprise.

Although not illustrated, in various embodiments storage service 220 may be configured to interface with backup data store, system, service, or device. Various data, such as data pages, log records, and/or any other data maintained by storage service internal clients, such as database service 210 or other virtual computing services 230, and/or external clients such as clients 250a through 250n, may be sent to a backup data store.

Figure 3:
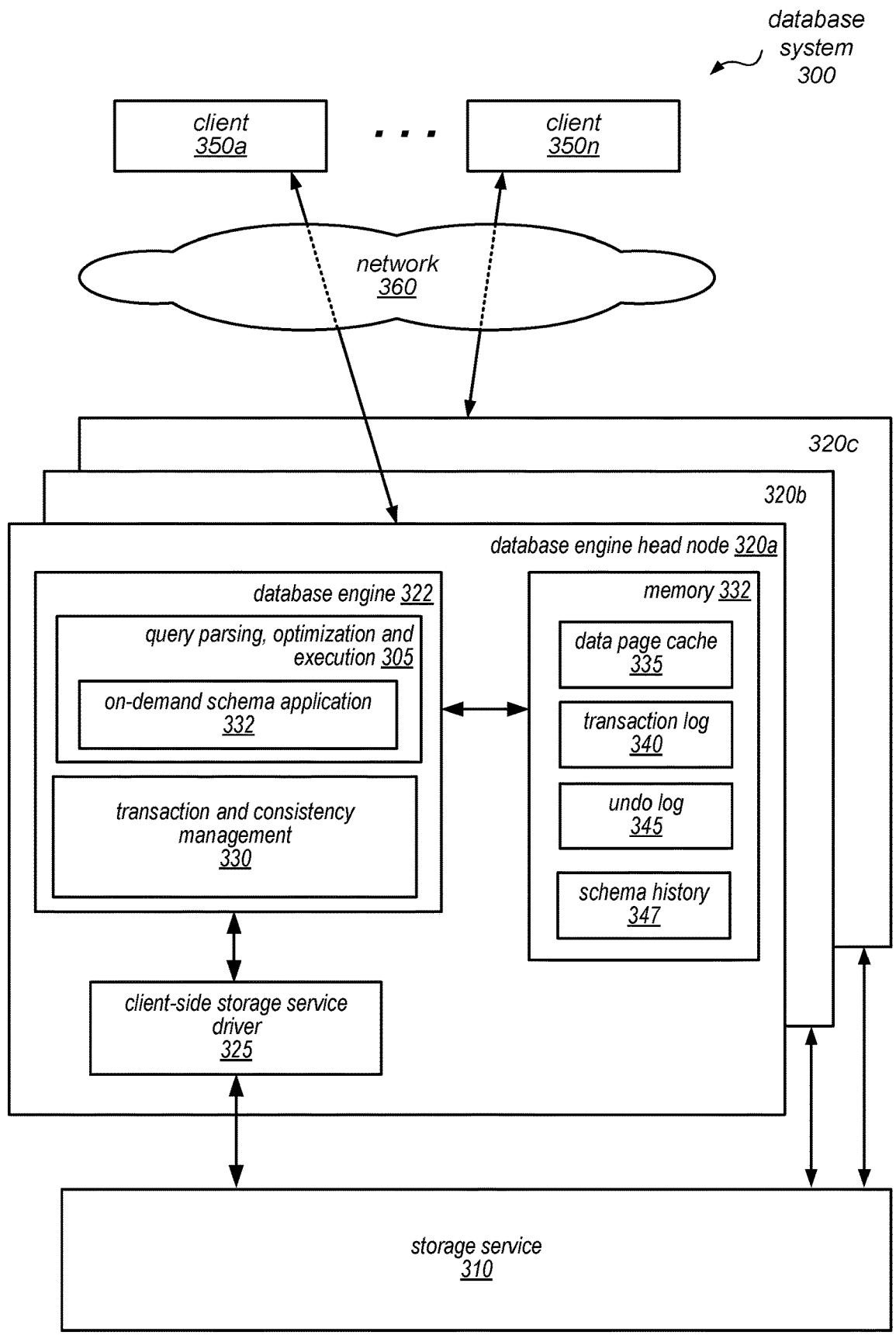
FIG. 3 is a block diagram illustrating various components of a database service that includes a database engine that implements on-demand data schema modifications for data maintained in a separate storage service, according to some embodiments.

FIG. 3 is a block diagram illustrating various components of a database service that includes a database engine that implements on-demand data schema modifications for data maintained in a separate storage service, according to some embodiments. In this example, database system 300 includes a respective database engine head node 320 for each of several databases and a storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, storage service 310, which may be employed by the database system to store a database volume (such as data pages of one or more databases, as well as redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., access requests, data schema modification requests, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate.

In some embodiments, query parsing, optimization, and execution component 305 may implement on-demand schema application 332 which may perform the various techniques discussed below with regard to FIGS. 6-9. For example, a request to alter a database table, such as a request to drop a column in a table, may be received at database engine head node 320a. Database engine 322 may parse the request via query parsing, optimization and execution 305 to determine that the request includes a request to modify the data schema for the table. On-demand schema application 332 may write a description of the modification to in-memory cache schema history 347 in memory 332. Database engine 322 may also generate a redo log record indicating that stores the description as a change to the schema history that is maintained as part of metadata for the database table persistently in distributed storage service 310 in a manner similar to the various techniques discussed below for updates or queries to user data below with regard to FIG. 5.

On-demand schema application 332 may also determine whether a new version of a data schema is to be applied to data that is accessed to process access requests, such as queries which read data or requests to insert new data or update existing data, which write data. For example, a logical sequence number (LSN) may be assigned to each redo log record that is generated and sent to storage service 310 to describe changes to both user data and metadata maintained and accessed only by database engine 322 to process access requests. Therefore, LSNs may be assigned to each modification to a data schema, as the modification may be stored by sending a redo log record describing the modification to be stored as part of database metadata, the schema history. Moreover, to as LSNs are assigned to each change made to user data by sending a redo log record with an assigned LSN to be stored and eventually applied to a corresponding data page in storage service 310, the assigned LSN for a current version of a data page that is accessed to process the access request may also be determined. On-demand schema application 332 may compare the LSN values between an accessed data page for processing an access request (or for multiple accessed data pages) and LSN values for modifications in schema history (either in in-memory schema history cache 347 or the persistent version of schema history in storage service 310). If the accessed data page(s) have LSN values less than a modification for the schema history, then the data pages have not yet been reformatted to match a newer version of the data schema that has been created as a result of a data schema modification request. Therefore, on-demand schema application 332 may apply the new version to include those modifications with LSN values greater than the LSN value of the data page(s) to the accessed data page(s) (e.g., by rewriting the data page(s) to include the formats as part of the write request or reformatting the data page(s) when evaluating and/or returning results to a read request (e.g., a query)).

On-demand schema application 332 may manage the contents of schema history 347 and, in at least some embodiments, may execute a background process to apply modifications in the schema history to data page(s) that have not been accessed by a write request. For example, on-demand schema application 332 may implement a garbage collection point for the schema history, which may indicate which modifications to the schema have been applied to a table. In order to advance the garbage collection point, on-demand schema application 332 may determine based on access patterns (or other statistics collected on how frequently data pages are accessed) that remaining data pages that have not been updated include a number modifications after the garbage collection point are not likely to be accessed (e.g., within a period of time). On-demand schema application 332 may then reformat these data pages to include the modifications so that the garbage collection point can be advanced to include the additionally applied modifications. In some embodiments, the garbage collection point for schema history may be determined by whether a transaction that was initiated prior to a schema modification (but not yet committed) is ongoing. Instead of performing a roll-back of the transaction (as discussed below with regard to FIG. 9), the garbage collection point may be maintained so that the prior schema information consistent with the ongoing transaction can be applied to execute the transaction. Once the transaction is committed, then the garbage collection point may be advanced.

Database engine head node 320a may also include a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query parsing, optimization, and execution component 305 (which may, in turn, return them to database client 350a). Client-side storage service driver 325 may maintain mapping information about the database volume stored in storage service 310, such that a particular protection group maintaining a partition of the database volume may be determined. Read requests and redo log records may then be routed to storage nodes that are members of the protection group according to the partition of user data to which the read request is directed or to which the redo log record pertains.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical data volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 4:
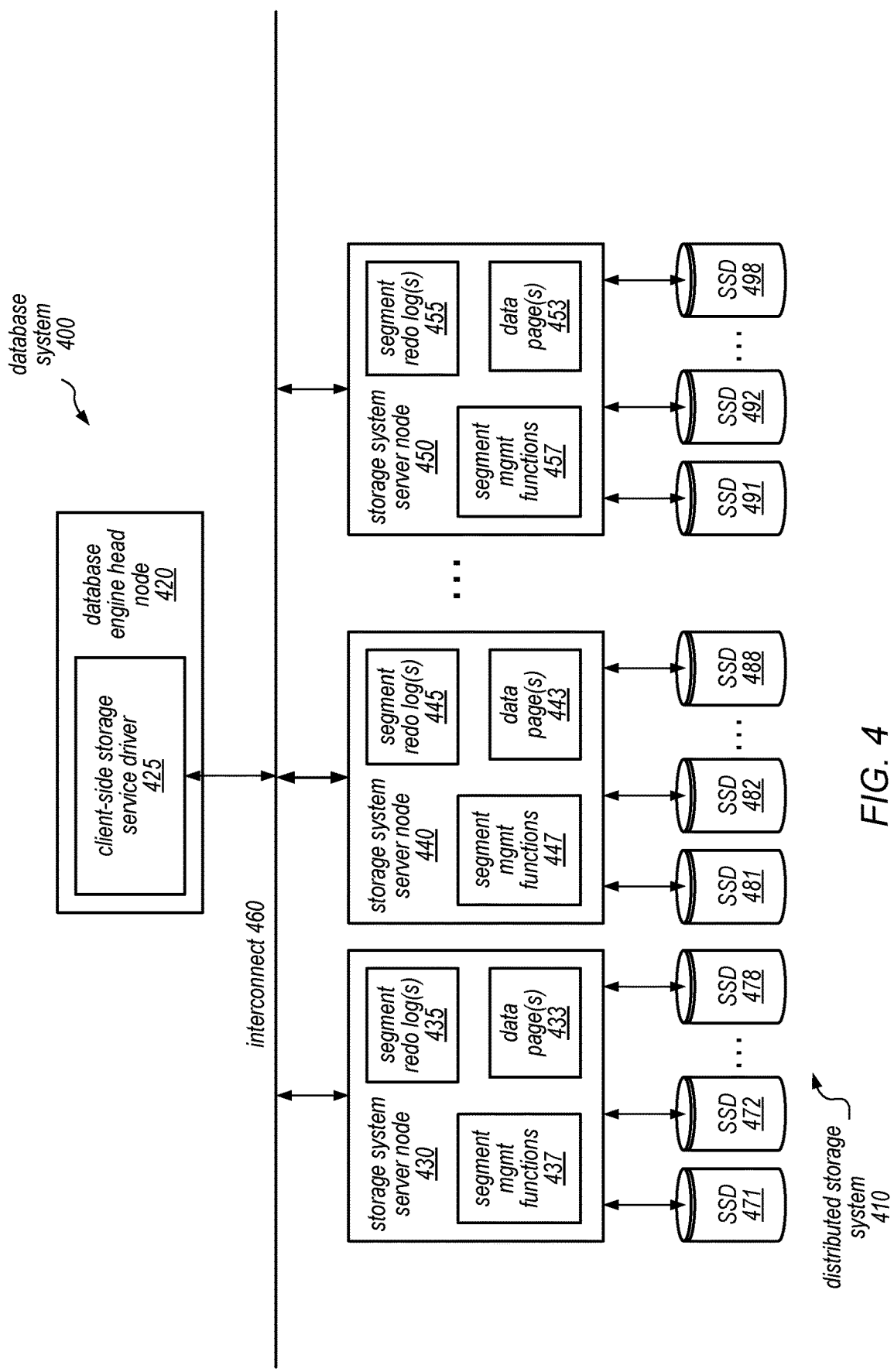
FIG. 4 is a block diagram illustrating a distributed storage system, according to some embodiments.

As used herein, the following terms may be used to describe the organization of data by a distributed storage system as illustrated and described by FIG. 4, according to various embodiments. However, in other embodiments, such as data stores that do not implement log-structured storage, such terms may be differently defined. Thus the following discussion of terms is provided to include different examples and is not intended to be limiting as to other definitions known to those of ordinary skill in the art.

Volume: A volume may be a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., LSN) assigned from a logical sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment may be a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page may be a block of storage, generally of fixed size. In some embodiments, each page is a block of storage (e.g., of virtual memory, disk, or other physical memory or storage device) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page may be a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space.

Payload: The payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages may be the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware. User pages may include database contents, such as index pages of a b-tree structure, leaf nodes of the b-tree structure (including the content of the table, such as rows or entries in the table), metadata for the database service, including data dictionary information (e.g., system tables of metadata to track objects, like tables, indexes, and columns).

In at least some embodiments, data dictionary information may include a schema history table (or tables) that tracks changes to the data schemas of one or more tables. Schema history table may include entries or rows that include data such as the LSN assigned to a modification, the identifier of the table to which the modification applies, a description of the change to be performed (e.g., add, remove, re-order columns, change column data type, etc.), and other information that may be used, such as a transaction identifier for a transaction that included the data schema change. As with other user pages, redo log records may be received from the database engine head node describing changes to data page (s) that store the schema history table. Similarly, entries may be read from the schema history table by returning the appropriate user pages of the schema history table to the database engine head node upon request (e.g., in case of an in-memory schema history cache miss).

Data page: A data page may be a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node may be a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

One embodiment of a distributed storage system is illustrated by the block diagram in FIG. 4. In at least some embodiments, storage nodes 430-450 may store data for different clients as part of a multi-tenant storage service. In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 5:
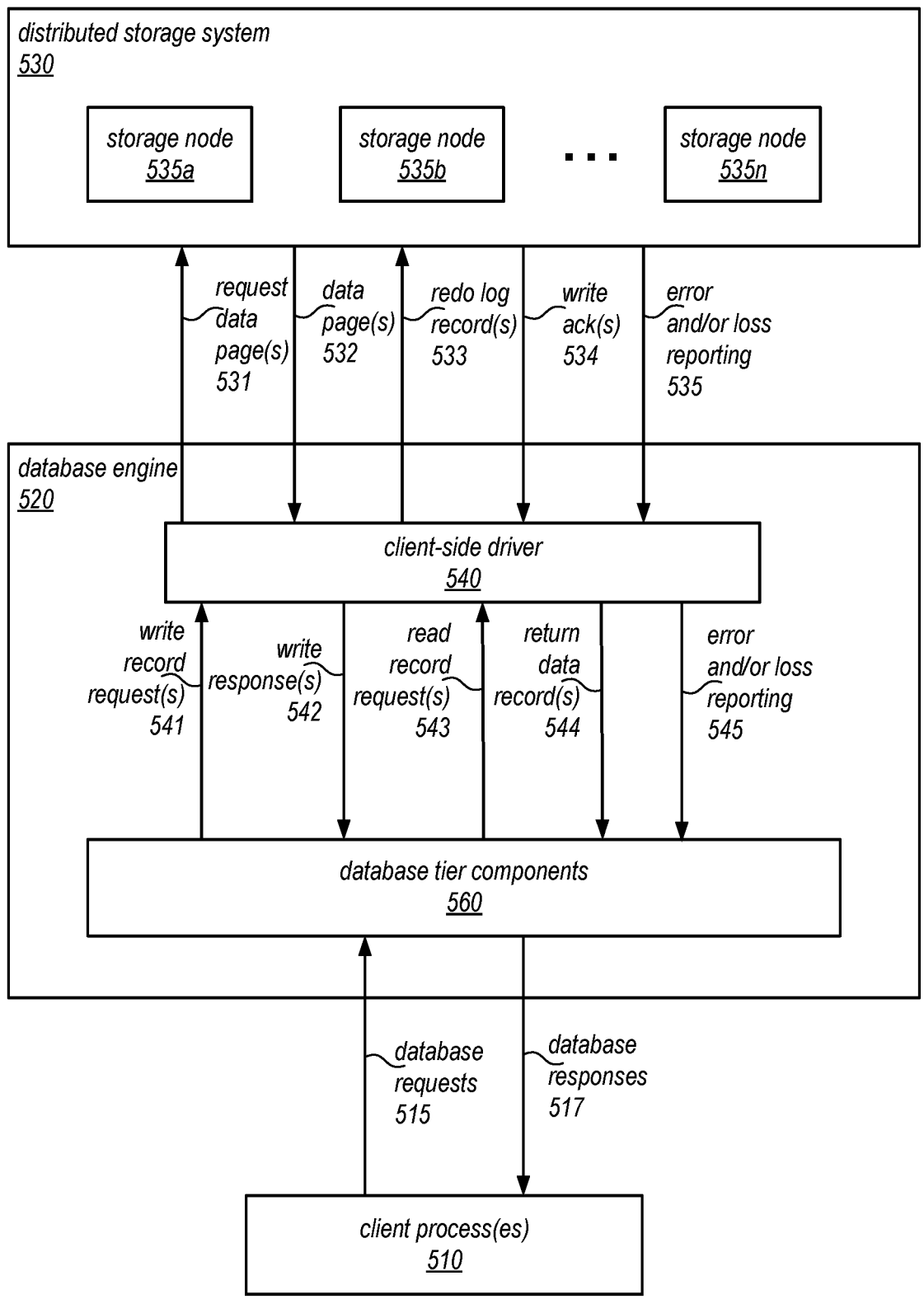
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store log records for data pages, schema history, transaction logs and/or undo logs (such as those stored by data page cache 335, transaction log 340, undo log 345, or schema history 347 of FIG. 3). In various embodiments, database engine 520 may have obtained a volume epoch indicator or other identifier from distributed storage system 530 granting access writes to a particular data volume, such as by sending a request to open the data volume to distributed storage system 530.

In this example, one or more client processes 510 may send database requests 515 (which may include read and/or write requests targeting data stored on one or more of the storage nodes 535a-535n) to database tier components 560, and may receive database responses 517 from database tier components 560 (e.g., responses that include write acknowledgements and/or requested data). Each database request 515 that includes a request to write to a data page may be parsed and optimized for execution. Database tier components 560 may either access an cached version of data page(s) in data page cache 335 or may submit read record request(s) 543 to client-side driver (which may request 531 and receive 532 the appropriate data page(s) upon which the write requests are to be performed). Database tier components 560 may then generate one or more write record requests 541, which may be sent to client-side driver 540 for subsequent routing to distributed storage system 530. On-demand schema modifications may be applied when it is determined that the data page(s) storing the data (or the data page that will eventually store the data, in scenarios where new data is inserted) has an assigned LSN (the LSN of the last redo log record applied to the data page, maintained in metadata describing the data page) that is less than one or more LSN values assigned to data schema modifications in data schema history. Thus the write request(s) 541 and subsequently generated redo log record(s) 531 may re-write the contents of the data page(s) (including rows not modified by the write request) according to a new version of the data schema that includes the data schema modifications identified in the data schema history.

Client side driver may generate one or more redo log records 531 corresponding to each write record request 541, and may send them to specific ones of the storage nodes 535 of specific protection groups storing the partition user data of user data space to which the write record request pertains in distributed storage system 530. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database request 515 that includes a request to read a data page may be parsed and optimized to generate one or more read record requests 543, which may be sent to client-side driver 540 for subsequent routing to distributed storage system 530. In this example, client-side driver 540 may send these requests 531 to specific ones of the storage nodes 535 of distributed storage system 530, and distributed storage system 530 may return the requested data pages 532 to database engine 520 (specifically to client-side driver 540). Client-side driver 540 may send the returned data pages to the database tier components 560 as return data records 544. As with write requests, on-demand data schema modifications may be performed to reformat received data records into a format that matches a new version of the data schema. Database tier components 560 may then evaluate and return the reformatted data (if it satisfies the query predicates or conditions for returning data) and send the reformatted data to one or more client processes 510 as database responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Figure 6:
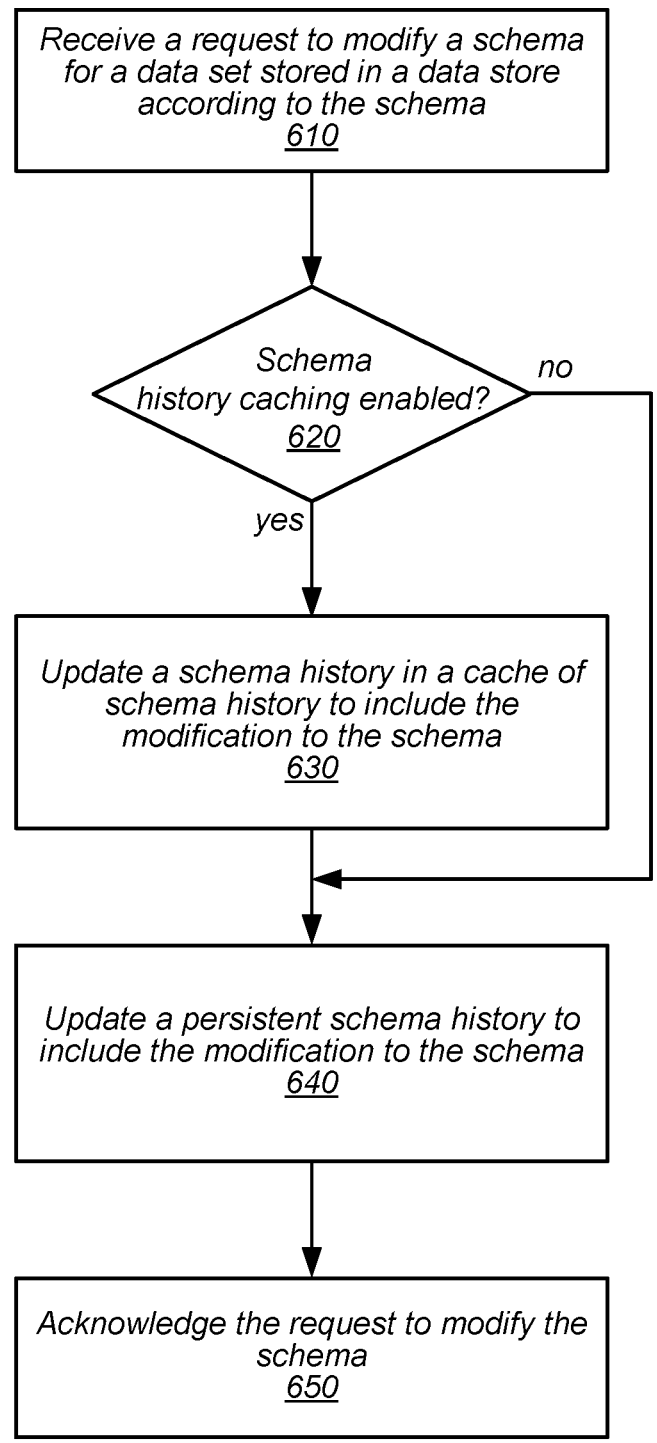
FIG. 6 is a high-level flowchart illustrating techniques to maintain schema history for on-demand data schema modifications, according to some embodiments.

The database service and storage service discussed in FIGS. 2 through 5 provide examples of a system that may perform on-demand data schema modifications. However, various other types of data stores (e.g., database systems that do not utilize a separate storage system) or other storage engines may implement on-demand data schema modifications. FIG. 6 is a high-level flowchart illustrating techniques to maintain schema history for on-demand data schema modifications, according to some embodiments.

As indicated at 610, a request may be received to modify a schema for a data set stored in a data store according to the schema, in various embodiments. A data set, as noted above, may be any collection of data stored together according to a data schema. A database table with a fixed number of columns, for example, may be a data set. Other data sets may include tables or collections of data that have a structured portion stored according to a data schema and an unstructured portion that includes additional data which may or may not be included in each item in the data set. For example, a non-relational database may implement tables that have a schema that requires a minimum number of attributes for an item, where additional attributes may be added or removed according as desired. The modification request may include various kinds of data schema modifications. For example, in a data store implementing a SQL interface, an ALTER TABLE statement may be submitted to add a column, drop a column, reorder columns, make a column NULL, make a column NOT NULL. In some embodiments, data schema modifications may include modifying a data type of a column or assigning a default value to a column (e.g., as a constant value or a value derived from a provided expression, such as column C default value=average (column A, column B)). In at least some embodiments, the modification request may include a flag, value or indicator that on-demand modification of the table according to the request may be performed so that the modification request is handled as an online request. Other modification requests may indicate offline processing or other online processing that are not on demand. In at least some embodiments, on-demand data schema modification may be a default setting for a data storage engine, and a separate request to disable or re-enable the setting may be performed.

As discussed above, in at least some embodiments, schema history for a data set may be cached in an in-memory cache. Therefore, as indicated by the positive exit from 620, if cache is enabled, the schema history in the cache may be updated to include the modification, as indicated at 630. For example, in some embodiments a write operation to the memory device maintaining the cache may be performed to add a new entry to a schema history table, including information such as an identifier for the data set modified, a version indicator (e.g., an LSN) assigned to the modification, and the change to be applied, for example. Whether or not caching is implemented, as indicated at 640, a persistent schema history maintained for the data set may be updated to include the modification. As with updating the cache, in some embodiments a write operation may be performed to persistent storage maintaining a schema history table, including similar information, such as the identifier for the data set modified, the version indicator (e.g., an LSN) assigned to the modification, and the change to be applied. Once the modification is included in the schema history, the schema change may be considered committed and the request to modify the schema may be acknowledged as complete, as indicated at 650.

The schema history maintained for a data set may be used to perform on-demand application of new versions of the data schema to the data set when the data set is accessed. FIG. 7 is a high-level flowchart illustrating techniques to process a request to write data to a data set that implements on-demand data schema modifications, according to some embodiments. As indicated at 710, a request to write data to a data set in a data store may be received. For example, SQL statements such as UPDATE, INSERT, or DELETE may be received which add, modify, or remove data from the data set. Note that while delete requests do not involve writing user-specified values, the data itself may be accessed and marked, overwritten, or otherwise changed to indicate that the data is no longer to be considered present in the data set. Therefore, the techniques discussed below can be applied to a delete request.

As indicated at 720, if a cache is enabled for schema history, then the schema history in the cache may be evaluated, as indicated at 730 to determine whether modifications to the data schema should be applied to the data accessed to process the write request. For example, a data schema version for the accessed data may be discoverable (e.g., by accessing data set metadata) which indicates a version or point in time of the data schema currently applied to the accessed data. In at least some embodiments, a monotonically increasing number or value, such as an LSN, may be assigned to data when accessed (e.g., by assigning an LSN to a data page or other storage location that includes the data when that storage location is last updated). Other monotonically increasing numbers may be assigned to schema modifications (e.g., as recorded in a schema history table), which indicate their version or point in time of application to the data set. If the assigned numbers are compared and indicate that the data has not been reformatted to apply subsequently received modifications to the data schema, then as indicated those modifications not yet applied may be identified for application to the data, as indicated by the positive exit from 750. If a cache miss occurs, then evaluate the schema history from persistent storage may be loaded into the cache for evaluation (not illustrated). In those embodiments where caching is not enabled, then the schema history in persistent storage may be evaluated, as indicated at 740, according to a similar technique (or caching is not implemented).

As indicated at 760, the data may be written to the data set formatted according to a version of the schema that includes the modification(s) and according to the write request. For example, if the write request updates a data value in a column in a row, then the updated data value will be written. Additionally the modifications needed to format the data to match the new version of the schema also be performed, such as by reordering the columns, adding a column, removing a column, etc. In at least some embodiments, in addition to writing the accessed data (e.g., the row or rows in the table indicated by the write request) all of the data maintained in the storage location that includes the accessed data (e.g., all of the rows in the page or block of storage that includes the updated, deleted or inserted row(s)) may also be rewritten to match the new version of the data schema. In this way, data schema modifications may be incrementally performed without having to access each piece of data in the data set (e.g., each row in a table). As indicated by the negative exit from 750, if no schema modifications are applicable (e.g., the modifications have been previously applied in response to a previous write request), then the data may be written to the data set according the write request alone, as indicated at 770. Once the write (at 760 or 770) completes, then the write request may be acknowledged as complete, as indicated at 780. For example, an indication may be sent to a requesting client that submitted the write request according to the same interface via which the write request was submitted.

Figure 8:
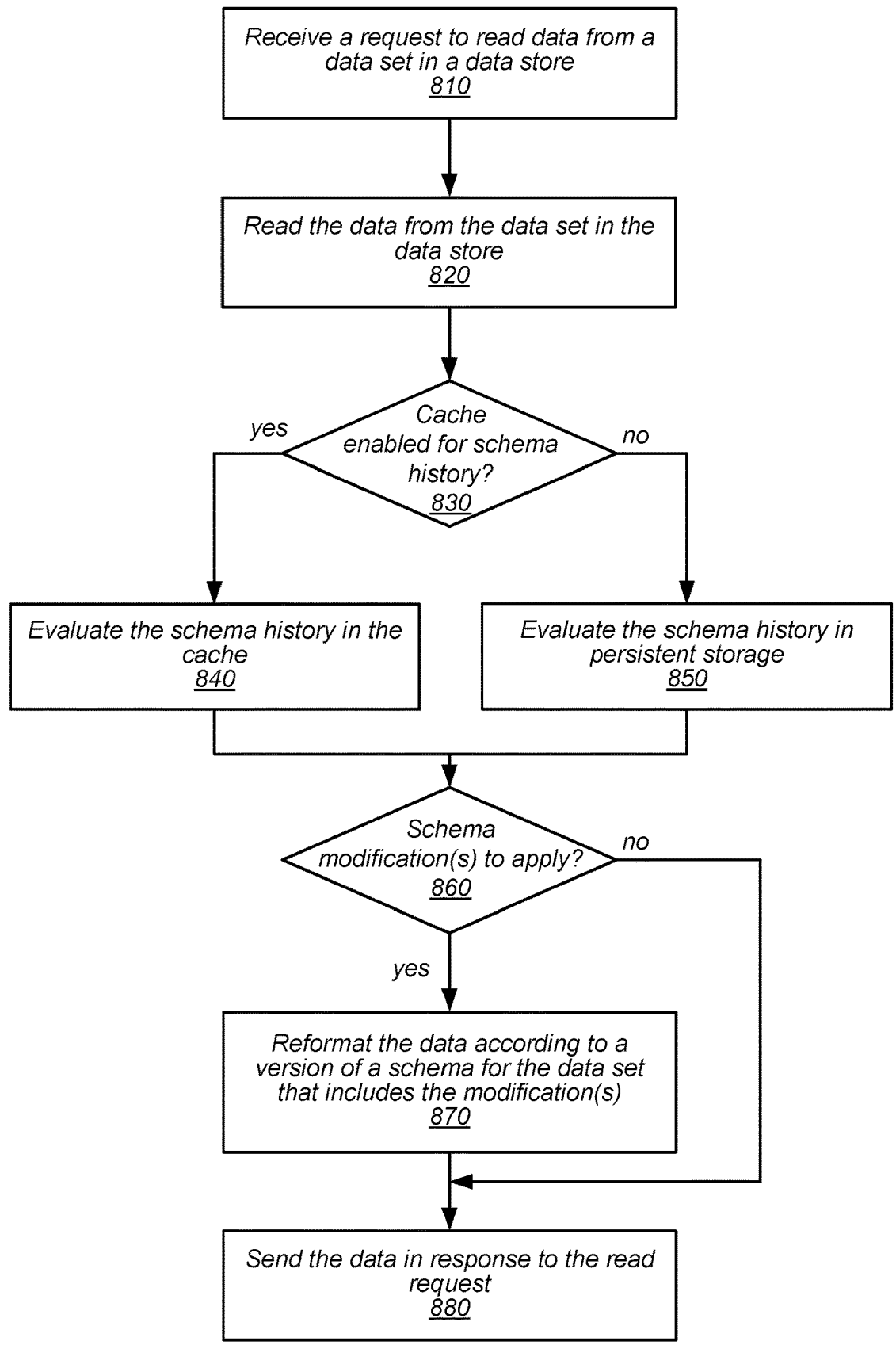
FIG. 8 is a high-level flowchart illustrating techniques to process a request to read data from a data set that implements on-demand data schema modifications, according to some embodiments.

On-demand application of data schema modifications may also be performed when data is accessed to process a read request directed to the data store. FIG. 8 is a high-level flowchart illustrating techniques to process a request to read data from a data set that implements on-demand data schema modifications, according to some embodiments. As indicated at 810, a request may be received to read data from the data set in the data store, in various embodiments. For example, a client may submit a SQL statement that includes a SELECT statement indicating one or more predicates (e.g., using WHERE clauses) to be satisfied by data that is to be returned in response to the read request. As indicated at 820, the data from the data set in the data store may be read in order to process the read request.

A determination or evaluation of schema history for the data set may be made to determine whether schema modifications are applicable to the retrieved data. If a cache is enabled for schema history, as indicated by the positive exit from 830, then the schema history in the cache may be evaluated. As with evaluating data accessed for processing a write request, a data schema version for the read data may be discoverable (e.g., by accessing data set metadata) which indicates a version or point in time of the data schema currently applied to the read data. In at least some embodiments, a monotonically increasing number or value, such as an LSN, may be assigned to the read data when last updated (e.g., by assigning an LSN to a data page or other storage location that includes the data when that storage location is last updated). Other monotonically increasing numbers may be assigned to schema modifications (e.g., as recorded in a schema history table), which indicate their version or point in time of application to the data set. If the assigned numbers are compared and indicate that the read data has not been reformatted to apply subsequently received modifications to the data schema, then as indicated those modifications not yet applied may be identified for application to the data, as indicated by the positive exit from 860. If a cache miss occurs, then the schema history in persistent storage may be copied into the cache and evaluated (not illustrated). In some embodiments, where a cache is not enabled for schema history, the schema history in persistent storage may be evaluated, as indicated at 850, according to a similar technique.

If schema modifications are determined to apply, as indicated by the positive exit from 860, then the read data may be reformatted according to a version of the schema that includes the modification(s), as indicated at 870. For example, if a column is removed and another column added by the schema modifications, then row(s) read from the table may be modified to remove the column and add the other column. This reformatted data may be evaluated with respect to query predicates, in some embodiments, so that a query dependent on a current data schema for the data set is received, that query will not fail because the read data is not in the current data schema. The data (reformatted or not reformatted if no modifications are applied) is then sent in response to the read request (e.g., by returning the data to a client or another component for processing, such as another part of a query processing engine for evaluation with respect to query predicates, joining with other retrieved data, etc.).

Figure 9:
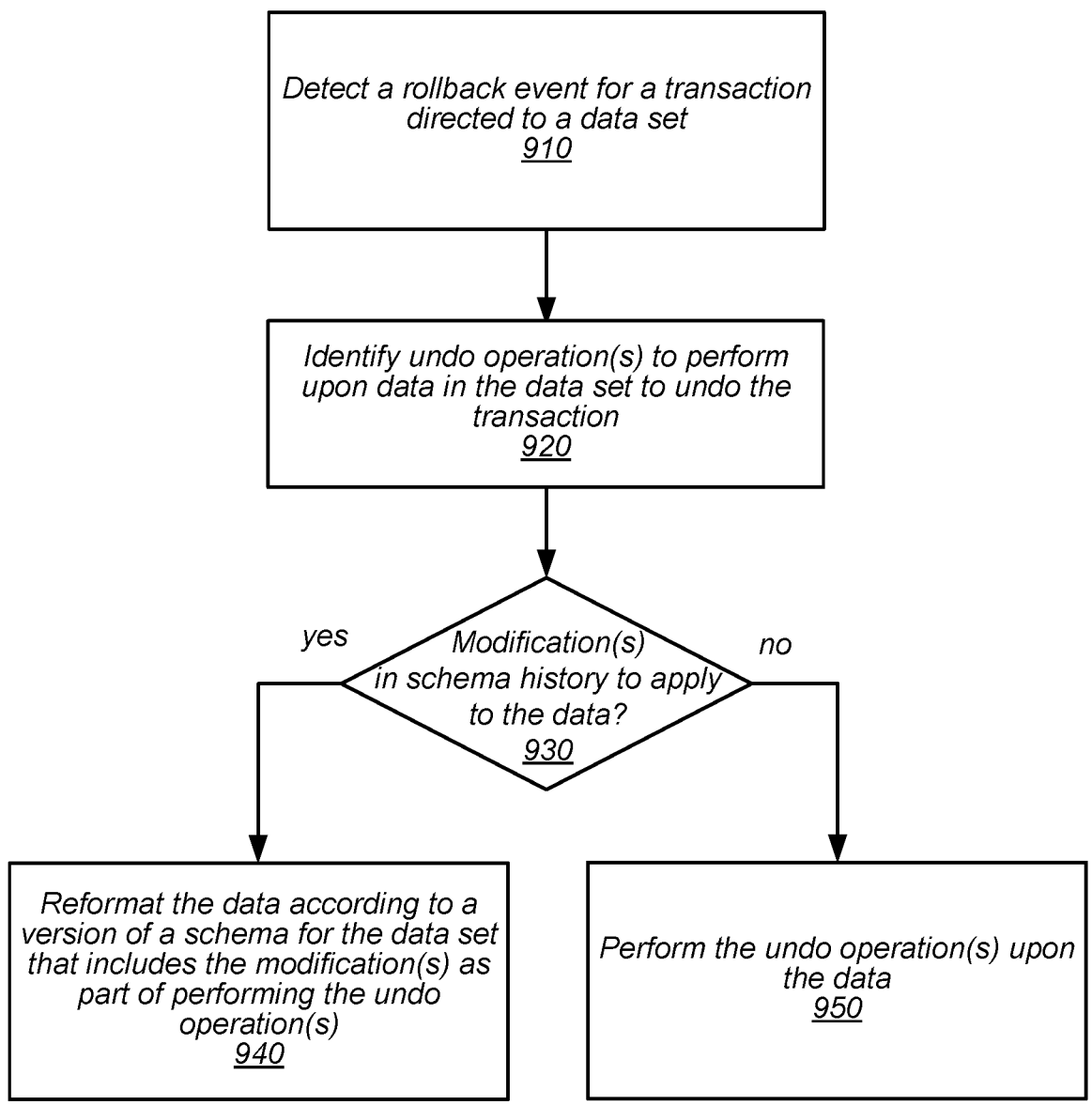
FIG. 9 is a high-level flowchart illustrating techniques to roll back a transaction affected by on-demand data schema modifications, according to some embodiments.

Data may not always be accessed in response to a user request. Storage engine failure (e.g., system or application crashes) or other events may trigger undo operations for ongoing transactions to undo incomplete, inconsistent, or conflicting transactions. FIG. 9 is a high-level flowchart illustrating techniques to roll back a transaction affected by on-demand data schema modifications, according to some embodiments. As indicated at 910, a roll back event may be triggered for a modification. For example, a storage engine crash may interrupt an ongoing transaction. In another example, a transaction may perform an action that conflicts with a data schema modification that occurred after the transaction was initiated (e.g., by reading from or writing to data affected by the schema modification).

As part of a roll back technique, one or more undo operations may be identified to perform upon data in the data set, to undo the operations of a transaction being rolled back, as indicated at 920. For example, a transaction table may be evaluated to determine if any ongoing transactions failed to commit before the storage engine crash. If so, then an undo log may be read to determine undo operations which may roll back changes made by the incomplete transactions. As with processing write requests, undo operations may access data that is stored in a data schema not current with the data schema described in data schema history. If data schema modification(s) are determined to apply to the data (according to techniques similar to those discussed above with regard to FIGS. 7 and 8) as indicated by the negative exit from 930, then the data may be reformatted according to a version of the data set that includes the modification(s) as part of performing the undo operation(s), as indicated at 940. For example, if value changes are reversed, then the reserved values may be written in addition to the removal of a column that has been dropped from the data schema. If no schema modifications apply, then the undo operation(s) may be performed as specified upon the data, as indicated at 950.

In at least some embodiments, transactions initiated but not committed prior to receiving a schema modification request may not be rolled back (as discussed above), but may instead be allowed to operate concurrently (similar to the techniques discussed above with regard to FIGS. 7 and 8). Unlike the techniques in FIGS. 7 and 8, schema history may be evaluated and applied to reads or writes performed as part of the transaction using a version of schema history consistent with the start of the transaction (e.g., not any subsequently received schema modifications while the transaction is not committed or ongoing).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 10:
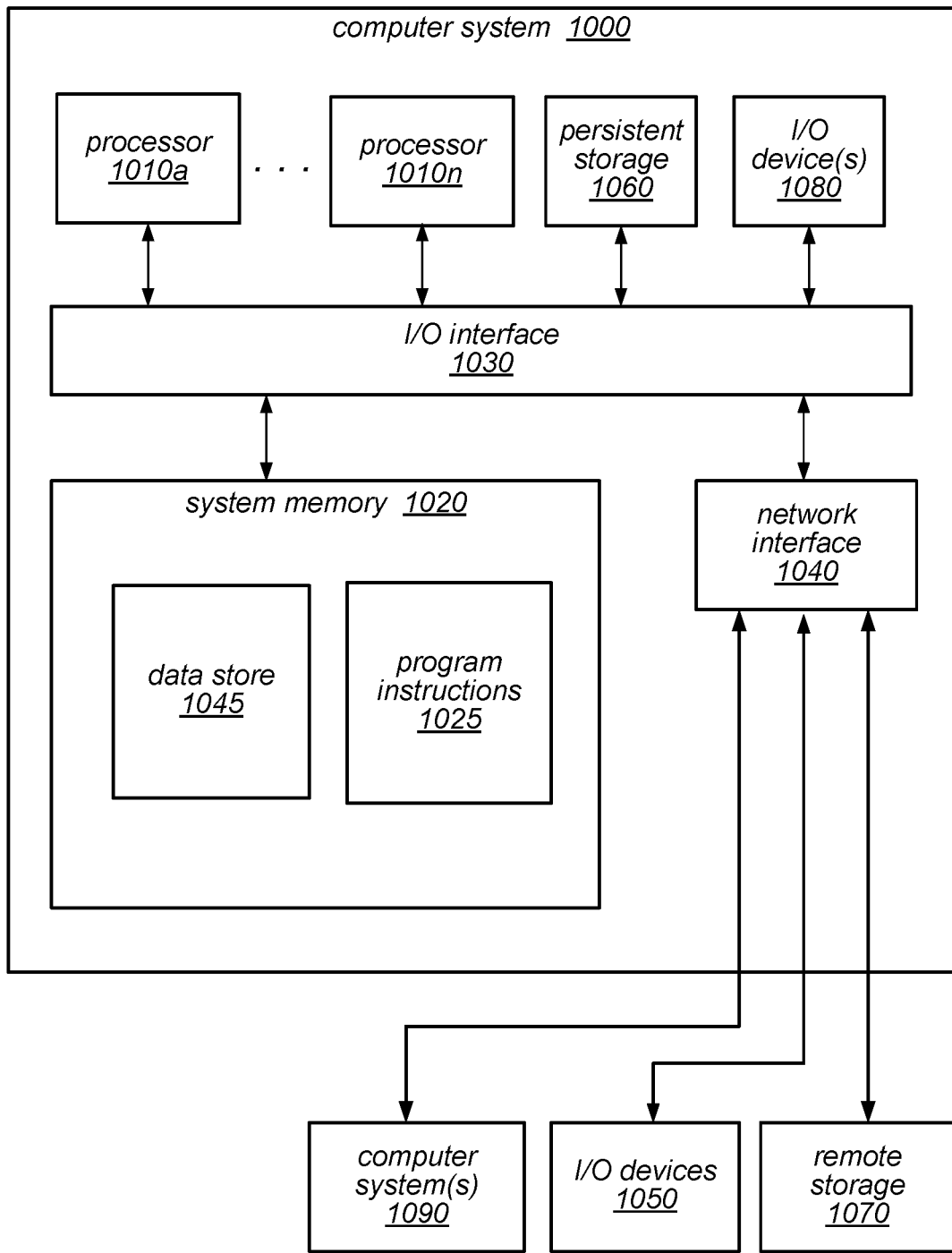
FIG. 10 is an example computer system, according to various embodiments.

FIG. 10 is a block diagram illustrating a computer system configured to implement on-demand data schema modifications, as well as various other systems, components, services or devices described above. For example, computer system 1000 may be configured to implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, computing node, or electronic device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more storage devices configured to store a data set according to a schema for the data set;
   at least one processor;
   a memory to store program instructions that, if executed, cause the at least one processor to perform a method, comprising:
      receiving a request to modify the schema for the data set;
      responsive to determining that on-demand data schema modifications are to be performed for the data set, updating a schema history stored at the one or more storage devices for the data set to include the modification to the schema;
      acknowledging the modification to the schema;
      receiving a first access request directed to a first portion of stored data in the data set;
      in response to receiving the first access request:
         evaluating the schema history to determine that the modification to the schema is applicable to perform the first access request, wherein the evaluating comprises determining that the modification is received prior to the first access request and not yet applied to the first portion of the stored data in the data set; and
         servicing the first access request, comprising:
            reformatting the first portion of the stored data as described by a version of the schema that includes the modification;
            completing the first access request using the reformatted first portion of the stored data; and
      wherein a second portion of the stored data in the data set is reformatted responsive to a second access request directed to the second portion of the stored data in the data set.

2. The system of claim 1, wherein the first access request is a request to write the first portion of the stored data to the data set, and wherein completing the first access request comprises writing the reformatted first portion of the stored data to the one or more storage devices.

3. The system of claim 1,
   wherein the first access request is a request to read the first portion of the stored data;
   wherein the servicing the first access request further comprises reading the first portion of the stored data from the one or more storage devices, wherein the reformatting is performed upon the read data; and
   wherein completing the first access request comprises sending the reformatted data to the client.

4. The system of claim 1, wherein the at least one processor and the memory implement a storage engine of a network-based database service, wherein the one or more storage devices are implemented as part of a network-based data storage service, wherein the network-based database service and the network-based data storage service are implemented as part of a same network-based platform, and wherein the schema history is maintained in the network-based data storage service.

5. A method, comprising:
   performing, by one or more computing devices:
      receiving, a request to modify a schema for a data set stored in a data store according to the schema;
      responsive to determining that on-demand data schema modifications are to be performed for the data set, updating a schema history maintained for the data set to include the modification to the schema;
      acknowledging the modification to the schema;
      responsive to receiving a first access request directed to a first portion of stored data in the data set:
         determining that the modification in the schema history is applicable to perform the first access request, wherein the determining comprises determining that the modification is received prior to the first access request and not yet applied to the first portion of the stored data stored in the data set; and
         performing the first access request, comprising:
            applying, to the first portion of the stored data, a version of the schema that includes the modification to reformat the first portion of the stored data; and
            completing the first access request using the reformatted first portion of the stored data;
   wherein the version of the schema that includes the modification is applied as part of performing another access request directed to a second portion of the stored data in the data set.

6. The method of claim 5, wherein the first access request is a write request to write the first portion of the stored data to the data set, and wherein completing the first access request comprises writing the reformatted first portion of the stored data to the data store according to the write request.

7. The method of claim 6, wherein the data set is a table, wherein the first portion of the stored data is a row in the table, wherein the row is stored along with one or more other rows in the table at a storage location in the data store, and wherein completing the first access request comprises rewriting the one or more other rows in the table at the storage location such that the one or more other rows are formatted according to the version of the schema.

8. The method of claim 5,
wherein the first access request is a request to read the first portion of the stored data from the data set that is received from a client;
wherein performing the first access request further comprises reading the first portion of the stored data from the data store; and
wherein completing the first access request comprises sending the reformatted first portion of the stored data to the client.

9. The method of claim 5,
wherein the schema history is maintained in an in-memory cache;
wherein the method further comprises storing the modification to the schema as part of a persistent copy of the schema history maintained in the data store; and
wherein the determining that the modification in the schema history is received prior to the first access request and not yet applied to the data comprises accessing the schema history in the in-memory cache.

10. The method of claim 5, wherein the first access request is an undo operation performed with respect to the first portion of the stored data, and wherein completing the first access request comprising writing a new version of the first portion of the stored data determined by the undo operation in the data store that is reformatted according to the version of the schema.

11. The method of claim 10, wherein the undo operation is triggered by a roll-back event for a transaction directed to the data set initiated prior to receiving the request to modify the schema, and wherein the roll-back event is triggered in response to an attempt by the transaction to alter the first portion of the stored data of the data set modified by the modification to the schema.

12. The method of claim 5, further comprising applying a version of the schema that includes the modification to one or more other portions of the data set as part of a background process to complete application of at least some of the schema history.

13. The method of claim 12, further comprising reclaiming storage space in the schema history from the completed application of the at least some of the schema history to store subsequently received modifications to the schema.

14. A non-transitory, computer-readable storage medium, storing program instructions that when executed by one or more computing devices cause the one or more computing devices to implement:
receiving, at a storage engine for a data set stored in a data store, a request to modify a schema for the data set, wherein the data set is stored in the data store according to the schema;
responsive to determining that on-demand data schema modifications are to be performed for the data set, updating, by the storage engine, a schema history maintained for the data set to include the modification to the schema;
acknowledging, by the storage engine, the request to modify the schema;
responsive to receiving a first access request received at the storage engine and directed to a first portion of stored data in the data set:
accessing, by the storage engine, the schema history to determine that the modification in the schema history is applicable to perform the first access request, wherein the evaluating comprises determining that the modification is received prior to the first access request and not yet applied to reformat the first portion of the stored data stored in the data set; and
performing, by the first storage engine, the first access request, wherein the program instructions cause the one or more computing devices to implement:
reformatting the first portion of the stored data as described by a version of the schema that includes the modification; and
completing the first access request using the reformatted first portion of the stored data; and
wherein the version of the schema that includes the modification is applied as part of servicing another access request directed to a second portion of the stored data in the data.

15. The non-transitory, computer-readable storage medium of claim 14, wherein the first access request is a request to update the first portion of the stored data in the data set, and wherein the program instructions cause the one or more computing devices to further implement:
reading, by the storage engine, the first portion of the stored data from the data store, wherein the reformatting is performed upon the read data;
applying, by the storage engine, the update to the reformatted first portion of the stored data according to the request to update the data; and
replacing, by the storage engine, the first portion of the stored data in the data store with the updated reformatted first portion of the stored data.

16. The non-transitory, computer-readable storage medium of claim 14,
wherein the first access request is a query, received from a client, that satisfies one or more query predicates;
wherein, in performing the first access request, the program instructions cause the one or more computing devices to further implement:
reading, by the storage engine, the first portion of the stored data from the data store, wherein the first portion of the stored data satisfies the one or more query predicates, and wherein the reformatting is performed upon the read first portion of the stored data; and
wherein, in completing the first access request, the program instructions cause the one or more computing devices to implement sending, by the storage engine, the reformatted first portion of the stored data to the client as part of a response to the query.

17. The non-transitory, computer-readable storage medium of claim 14, wherein the modification to the schema is assigned a sequence identifier in a logical ordering of changes to the data set, and wherein, in determining that the modification in the schema history is received prior to the first access request and not yet applied to the data in the data set, the program instructions cause the one or more computing devices to implement comparing the sequence identifier assigned to the modification to the schema with a different sequence identifier assigned to the data in the data store, wherein the comparison indicates that the sequence identifier occurs subsequent to the different sequence identifier in the logical ordering of changes to the data set.

18. The non-transitory, computer-readable storage medium of claim 14, wherein the schema history is maintained in an in-memory cache, wherein accessing the schema history includes accessing the in-memory cache, and wherein the program instructions cause the one or more computing devices to further implement storing, by the storage engine, the modification to the schema as part of a persistent copy of the schema history maintained in the data store.

19. The non-transitory, computer-readable storage medium of claim 14, wherein the request to modify the schema indicates that the modification is to be maintained as part of the schema history.

20. The non-transitory, computer-readable storage medium of claim 14, wherein the data set is a database table and wherein the storage engine is implemented as part of a network-based database service.

* * * * *